Sept. 15, 1925.  
T. B. DARLEY  
TIRE SHOE  
Filed July 21, 1923
1,553,436
2 Sheets-Sheet 1
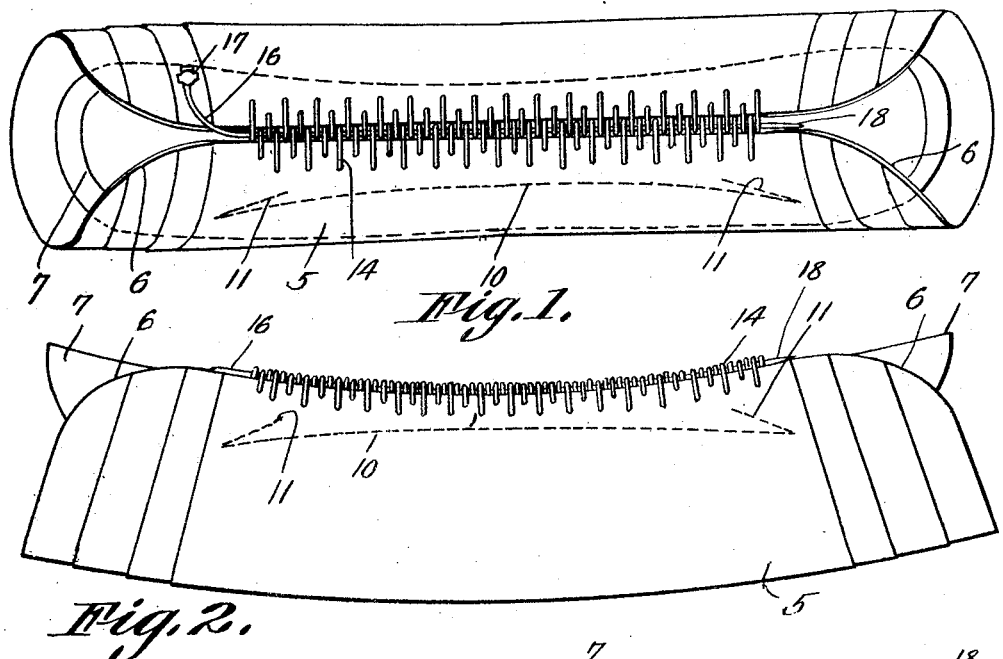
Fig. 1.
Fig. 2.
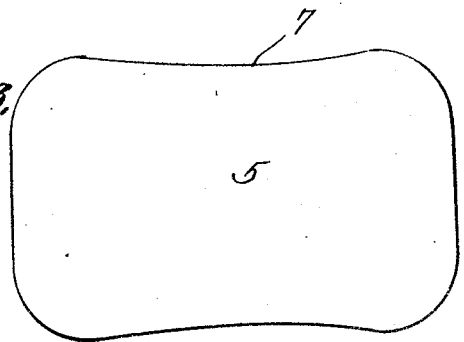
Fig. 3.
Fig. 14.
Fig. 4.
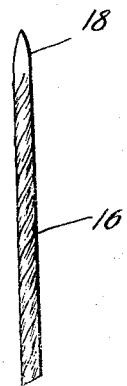
Fig. 6.
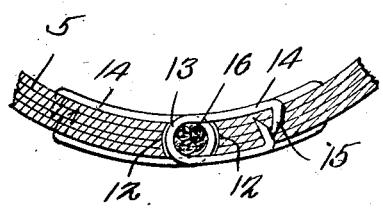
Fig. 5.
Inventor  
T. B. Darley  
By C. A. Snow & Co.  
Attorneys Sept. 15, 1925. 1,553,436
T. B. DARLEY
TIRE SHOE
Filed July 21, 1923  2 Sheets-Sheet 2
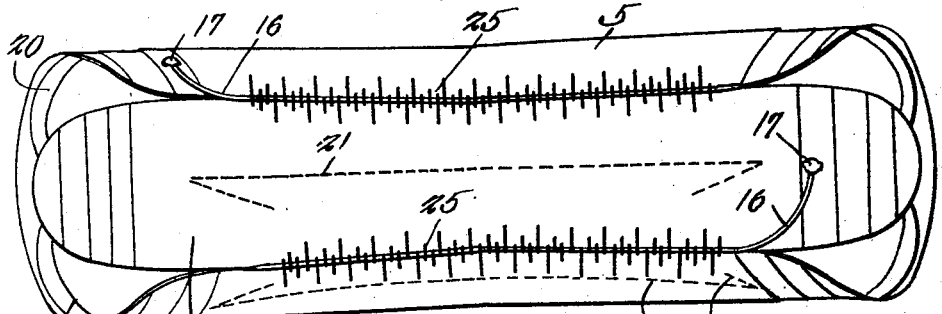
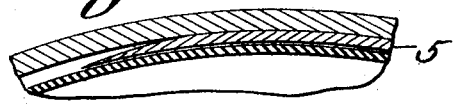
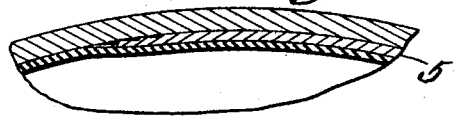
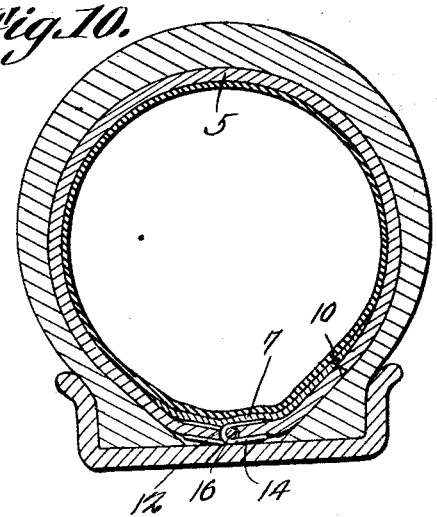
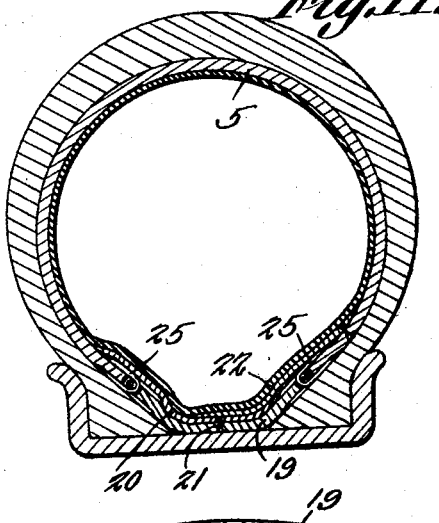
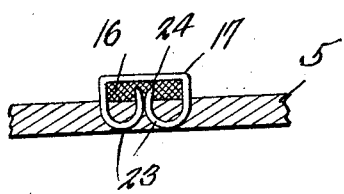
Inventor
T. B. Darley Patented Sept. 15, 1925.

1,553,436

UNITED STATES PATENT OFFICE.

THOMAS B. DARLEY, OF DUBLIN, GEORGIA.

TIRE SHOE.

Application filed July 21, 1923. Serial No. 652,983.

*To all whom it may concern:*

Be it known that I, THOMAS B. DARLEY, a citizen of the United States, residing at Dublin, in the county of Laurens and State of Georgia, have invented a new and useful Tire Shoe, of which the following is a specification.

This invention relates to tire reinforcement devices or shoes, the primary object of the invention being to provide a reinforcing device or shoe which may be readily and easily applied or removed and one which when properly adjusted, will not move from its position within a tire casing, to defeat the purpose of the shoe.

A further object of the invention is to construct a tire shoe to reduce wear between the tube and shoe positioned thereon to the minimum, to insure the efficiency of the shoe.

A still further object of the invention is to construct a shoe of a novel contour with greater degrees of curvature than the tire so that the air pressure within the tube will be directed to the shoe at a point adjacent to the ruptured portion of the tire casing to insure the shoe receiving the force of the air in the tube and relieving pressure on the casing.

Another important object of the invention is to provide means for permitting of the adjustment of the shoe, adapting the same for use in connection with tires of various diameters and sizes.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view disclosing the connected edges of the shoe.

Fig. 2 is a side elevational view thereof.

Figure 3 is a diagrammatical view of the shoe after it is pressed out of shape.

Figure 4 is a plan view of the protecting flap.

Figure 5 is a sectional view through the connected edges of the shoe.

Figure 6 is a detail view of the metallic fastening cord.

Figure 7 is an elevational view disclosing a splice as positioned in the shoe.

Figure 8 is a fragmental sectional view disclosing a shoe as positioned in a tire casing prior to the inflating of the inner tube thereof.

Figure 9 is a fragmental sectional view disclosing the position taken by the shoe when the inner tube has been inflated.

Figure 10 is a transverse sectional view through a tire after the inflation of the inner tube thereof.

Figure 11 is a transverse sectional view disclosing the position of the splice and flaps of the shoe when the tire is inflated.

Figure 12 is a sectional view through the fastening member employed for securing the flexible cord to the shoe.

Figure 13 is a transverse sectional view of the splice as used in connection with the structure shown by Figure 11.

Figure 14 is a transverse sectional view through a protecting flap as illustrated by Figure 4.

Referring to the drawings in detail, the shoe includes a body portion 5 formed of a plurality of superposed sections constructed of rubberized tire fabric or other suitable material, which are vulcanized or otherwise secured together.

As shown, the inner section is of a length greater than the lengths of the remaining sections, each section being shorter than the adjacent inner section so that the ends of the shoe taper to feather-like edges.

In order that an even rubberized surface will be maintained throughout the tapered ends of the shoe, the outside portions of the ends of the sections are cut away or ground off so that the end of one section merges into the surface of the adjacent section to provide a series of vacuum locks with the casing.

The adjacent corners of the body portion 5 are cut away as at 6 to allow for an expansion and contraction of the protecting flap and shoe at its ends. As shown by Figure 3 of the drawings, the width of the central portion of the body 5 is exceedingly less than the width of the body portion at its ends, the edges of the body portion being curved in lines of much greater degrees than the corresponding edges of the casing in which the shoe is positioned so that when the fastening devices are positioned in the shoe, the curvatures of the edges of the shoe will be maintained in a greater degree than the curvatures of the edges of the casing.

Thus it will be seen that when the body portion is properly shaped and the adjacent edges thereof connected, the diameter of the shoe at its central portion will be less than the diameter of the shoe at the ends thereof which feature counteracts the expansion of the shoe so that the side walls thereof, when properly positioned over a ruptured or rim cut portion of a tire casing, will receive the strain directed to the inner tube by the air pressure contained therein and will prevent the air pressure being received by the ruptured portion of the tire.

The protecting flap is also formed of a plurality of superposed sections formed of rubberized fabric material and forms a part of the shoe, the flap being indicated at 7. This flap is formed with parallel side edges 8 which are curved as clearly shown by Figure 4 of the drawings, and as shown, the flap is curved transversely providing a structure that will in its natural position conform to the curvature of an inner tube, when the same is inflated. The ends of the protecting flap are rounded in a unique manner as at 9, so that when the inner tube is positioned in the shoe, the protecting flap will conform, at the ends thereof, to the contour of the fragile tube positioned therein. It might be further stated that the ends of the flap extend beyond the ends of the shoe of which the same forms a part, and are feathered, leaving the rubber exposed.

A line of stitching is indicated at 10 and secures the flap 7 to one wall of the shoe, the line of stitching being curved in a line opposite to the line of curvature of the adjacent edges of the shoe, the ends of the line of stitching extending rearwardly as at 11 to further tie and reinforce the connection between the flap 7 and body of the shoe to prevent raveling of the stitching.

The line of stitching 10 terminates at points in spaced relation with the ends of the flap and ends of the body portion to allow the ends of the flap body portion to move and conform to the shape of the tire casing in which the shoe is positioned. The adjacent edges of the shoe are formed with grooves 12 that have curved walls to receive the curved portions 13 of the hooks 14, which hooks have inwardly extended points 15 that embed themselves in the material of the body portion. The hooks 14 provide eyes which are disposed throughout substantially the entire length of the shoe providing a continuous fastening means throughout the entire length of the closure of the shoe so that every portion of the adjacent edges of the shoe receives a uniform tension and is anchored against movement.

Cooperating with the eyes of the hooks 14 is a flexible connecting member indicated at 16 which preferably embodies a metallic cord, one end thereof being anchored to one of the sections of the body portion as at 17 so that the securing cord will be secured against displacement and provides a one unit construction ready for use at all times. The free end of the cord 16 is made solid and pointed as at 18, whereby the same forces alignment of the hooks and may be readily and easily threaded through the eyes of the hook members 14 to secure the edges of the shoe together.

In the modified form of the invention as shown by Figure 7 of the drawings, a splice 19 is provided, which splice is formed of a plurality of superposed sections constructed of rubberized fabric or other suitable material, the ends thereof being feathered to expose the rubber of the fabric, while the edges thereof are formed to cooperate with the adjacent curved edges of the shoe, there being provided a protecting flap 7 as used on the shoe, the protecting flap being secured to the splice by the line of stitching 21. The protecting flap 20 is designed to overlie the space between the splice and edge of the shoe nearest thereto. In this form of the invention, it will be noted that the flap 22 which forms a part of the shoe, also overlies the adjacent edges of the splice and shoe at the opposite side thereof. The splice is also formed with curved edges 25 that when positioned, lie in proximity to the edges of the shoe of which the splice forms a part, so that the shoe retains its proper contour.

Shown more particularly by Figure 12 of the drawings, the securing means indicated at 17 is formed with prongs 23 that are forced inwardly and upwardly, the extremities 24 thereof, embedding themselves in the flexible cord members 16 to protect the flap and inner tube against the pointed extremities thereof and hold the member 17 securely to the shoe.

It might be further stated that the ends of the shoe which are rubber coated will create a suction or vacuum within the tire casing in which the same is positioned when air pressure is brought to bear on the inner tube, positioned therein to the end that the walls of the shoe are moved into close engagement with the tire casing causing the ends of the shoe to adhere to the inner surface of the casing and insure against slipping or creeping of the shoe.

In order to further insure against slipping of the shoe, it is to be understood that before the tube is inflated, the shoe lies in a position as clearly shown by Figure 8 of the drawings, but when the inner tube within the shoe has been inflated, the ends of the shoe will expand or flare outwardly to contact with the inner surface of the casing in which the shoe is positioned as clearly shown by Figure 9.

As clearly illustrated by Figure 1 of the drawings, the flap 17, when the tube on which the shoe is positioned is inflated, is forced into close engagement with the metallic hook members 14 thereby protecting the inner tube against contact with the fasteners.

I claim:

1. A tire shoe including a body portion formed of a plurality of sections, said body portion being circular in cross section, and longitudinally curved to conform to the curvature of a pneumatic tire, a curved protecting flap secured within the shoe at a point adjacent to one edge thereof, a line of stitching for securing the flap to the shoe, the line of stitching being curved in a direction opposite to the direction of curvature, of the body portion, and the ends of the line of stitching being spaced from the ends of the body portion.

2. A tire shoe including a body portion, a protecting flap secured to the inner surface of the body portion, said protecting flap having curved parallel edges and having its ends rounded to cause the flap to conform to the curvature of the tire in which the shoe is positioned, and means for securing the adjacent edges of the shoe together.

3. In a reinforcing shoe, a body portion, means for securing the adjacent edges of the body portion together, a protecting flap, a line of stitching for securing the protecting flap with the body portion, the line of stitching having its ends terminating in spaced relation with the ends of the shoe and extended rearwardly.

4. A tire shoe comprising a body portion having its side edges curved inwardly at their central portions, securing hooks secured adjacent to the edges of the body portion, the outer edges of the securing hooks lying in a curved line parallel with the edges of the body portion, and means extending through the securing hooks for securing the edges of the body portion together.

5. A tire shoe including a body portion, the edges of the body portion being formed with grooves, hook members having curved outer ends, means extending through the hook members for drawing the hook members together, and the curved ends of the hook members adapted to lie in the grooves of the edges of the body portion.

6. A tire shoe including a body portion, a curved flap, the side edges of the flap being in parallel relation with each other, and means underlying the flap and engaging the flap for securing the side edges of the shoe together.

In testimony that I claim the foregoing as my own, I have hereto affixed my signature.

THOMAS B. DARLEY.